United States Patent

[11] 3,617,548

| [72] | Inventor | Robert A. Willihnganz<br>Rochester, Mich. |
|---|---|---|
| [21] | Appl. No. | 834,026 |
| [22] | Filed | June 17, 1969 |
| [45] | Patented | Nov. 2, 1971 |
| [73] | Assignee | General Motors Corporation<br>Detroit, Mich. |

[54] METHOD AND APPARATUS FOR THE CONTINUOUS SEPARATION AND REMOVAL OF OIL FROM WATER
5 Claims, 1 Drawing Fig.

[52] U.S. Cl. .................................................. 210/23,
210/484, 210/494, 210/DIG. 5
[51] Int. Cl. .................................................. B01d 17/02
[50] Field of Search ........................................... 210/83,
494, 484, 23

[56] References Cited
UNITED STATES PATENTS

| 3,229,817 | 1/1966 | Pall .............................. | 210/23 X |
| 3,417,015 | 12/1968 | Canevari et al. .............. | 210/23 |
| 3,471,401 | 10/1969 | Huval .......................... | 210/23 |

*Primary Examiner*—J. L. De Cesare
*Attorneys*—Peter P. Kozak and Sidney Carter

ABSTRACT: A method and apparatus for continuously separating and removing oil from a liquid of higher specific gravity. In the separation process, an immiscible mixture of oil in a liquid of higher specific gravity, such as water, is continuously passed through a knitted polyethylene, polypropylene or polyvinyl chloride packing which has an affinity for oil whereby the oil coalesces on the surface of the knitted polymer packing. The oil having a lower specific gravity than the water phase continuously rises along the surfaces of the knitted polymer packing and is released on the surface of the water phase as a layer which can be easily and continuously drawn off.

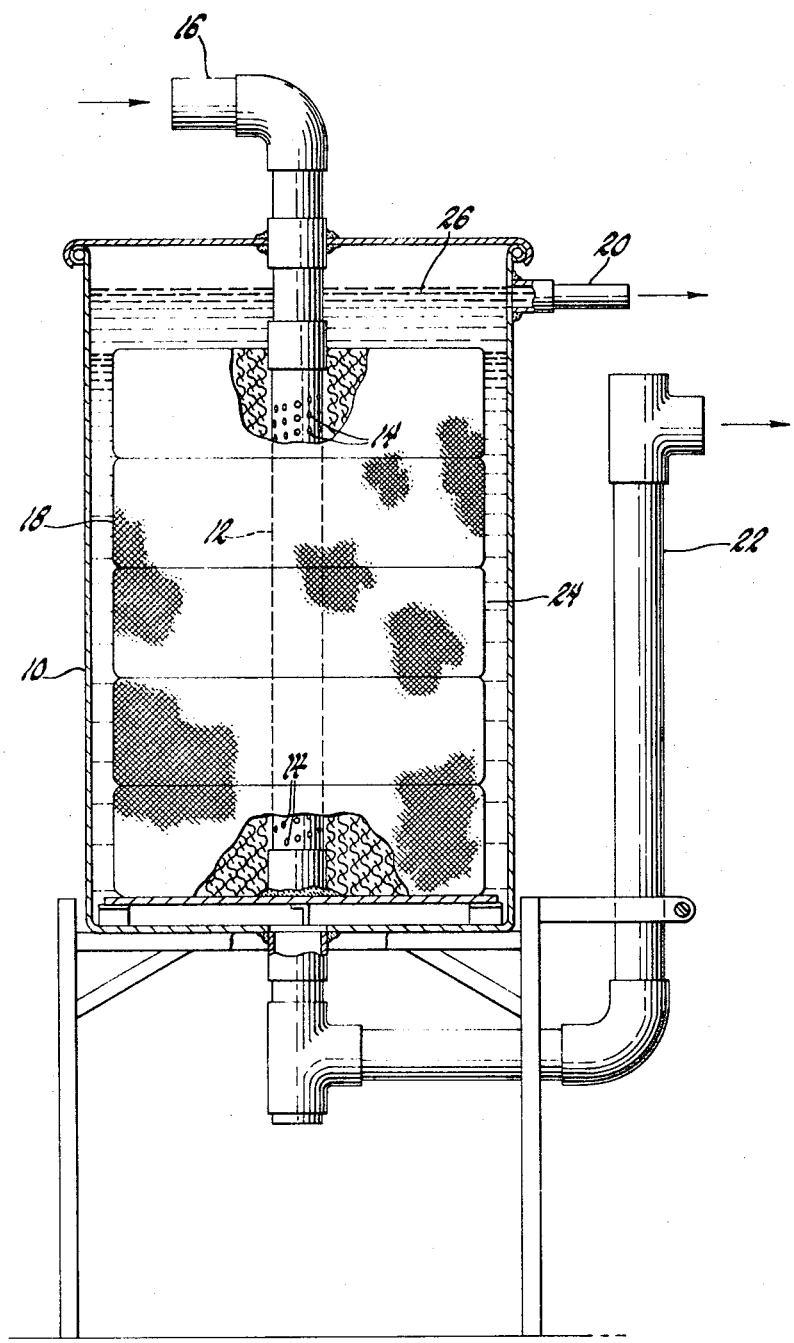

METHOD AND APPARATUS FOR THE CONTINUOUS SEPARATION AND REMOVAL OF OIL FROM WATER

This invention relates generally to a method and apparatus for continuously separating and removing normally liquid hydrocarbon compounds from a liquid of higher specific gravity, and more specifically to a method and apparatus for continuously separating and removing oil from a liquid of higher specific gravity, such as water.

Thy hydrocarbons and hydrocarbonlike substances which may be separated by the process of the present invention comprise those which are immiscible in water.

It is known that a strong surface attraction exists between the polymers, polyethylene, polypropylene and polyvinyl chloride, and normally liquid hydrocarbon compounds and that oil may be separated from water by means of this selective attraction. Several separating devices are known to the art which utilize the selective attraction between polymeric materials in the form of sheets or films and oil with a certain degree of effectiveness. However, these devices all have the disadvantage that the oil adheres to the polymeric material as a film or layer which inhibits further attraction. Consequently, in order to continue the separation process, the oil must be either mechanically removed from the material or the material and the oil must be discarded and replaced with a clean sheet of polymer. As a result, the efficiency of the processes is decreased in that a further processing step is needed to remove the oil from the polymeric material or in the case where the oil-coated material is discarded, to constantly replace the material. In addition, these devices are only effective in removing oil from the surface of the water and cannot be used to remove a dispersion of oil droplets occurring throughout the water.

An object of this invention, accordingly, is to provide a method and apparatus for continuously separating and removing oil from water in an extremely efficient manner whereby the disadvantages of the prior art are eliminated.

A more specific object is to provide a method and apparatus for continuously separating and removing oil from water whereby both the oil and the water may be separately and continuously withdrawn and whereby the polymeric material may be used indefinitely without replacement.

These and other objects are accomplished by passing an immiscible mixture of oil in water through a knitted polyethylene polypropylene or polyvinyl chloride packing which has an affinity for oil whereby the oil coalesces on the surfaces of the knitted polymer packing. The oil having a lower specific gravity than the water phase and the size of the knit being such that the movement of the oil is not retarded rises along the surfaces of the knitted polymer and is released on the surface of the water phase as a layer which is continuously drawn off.

Other objects and advantages will become apparent when reference is made to the following description and accompanying drawing which is a fragmentary cross-sectional side view of a specific embodiment of the present invention.

Referring now to the drawing in more detail, it will be observed that there is included in the separating apparatus a tank 10 having a tube 12 centrally disposed thereof with a plurality of holes 14 along its length, suitable conduit means 16 communicating with the tube 12 for transferring the immiscible oil-water mixture into the tank 10 through the tube 12, a knitted polymeric packing material 18 wrapped around the perforated tube 12 to a diameter somewhat less than the diameter of the tank 10, and suitable conduit means 20 and 22 for removing the oil and the water respectively following separation. Polymeric materials which are suitable for use in the present invention are polyethylene, polypropylene, polyvinyl chloride, and copolymers or mixtures thereof.

In operation, the immiscible mixture of oil in water passes through conduit 16 into the perforated tube 12 and radially outward through the perforations 14. As the mixture moves outward through the knitted polymer packing 18 the oil droplets suspended in the mixture coalesce on the surfaces of the knitted material while the water passes through to fill the tank 10. That is, the oil is selectively removed from the mixture and, as a result, the two distinct phases are separated—the oil phase adhering to the surfaces of the knitted polymer 18 and an oil-free water phase 24 filling the tank. Since the oil phase has a lower specific gravity than the oil-free water phase 24, where it is released as a layer 26 which floats on the surface of the oil-free water phase 24.

The knitted polymeric packing 18 is made in the form of an open mesh which provides a plurality of surfaces in the immediate vicinity of the oil droplets on which the droplets coalesce. The numerous openings in the knitted loops or between threads in the knitted packing are of a size such that the oil flows upwardly along the threads without filming over or clogging the openings which would retard the movement of the oil along the polymer surfaces. My investigations have shown that excellent results can be obtained by using a ¼-inch thick packing woven so as to form substantially square openings of approximately ⅛ inch on a side.

The oil layer 26 is then drawn from the tank 10 through the sidearm 20. The oil-free water phase 24 is drawn off through the bottom of tank 10 by means of a conduit 22 which maintains a desired level of water in the tank 10. Preferably the level of the oil-free water phase is slightly below the upper surface of the packing 18. The desired level is maintained by adjusting the height of the conduit 22 with respect to the height of the sidearm 20 to provide a continuous overflow of the oil layer. This height differential is a function of the difference in gravity between the oil and the water and the back pressure created by the flow of water through the conduit 22. In this manner, the continuously deposited oil layer 26 may be drawn off without remixing with the oil-free water phase 24 even in the event of sudden changes in the amount of oil in the mixture.

It may be seen that the present invention lies in the continuity of a method of separating and removing oil from an immiscible mixture of oil in water. Since the oil that is attracted to the knitted polymer continuously rises along its surfaces thereby freeing the surfaces for further attraction and separation, the polymer need not be replaced. As a result, the process can run continuously thereby offering a more efficient method of separating and removing oil than has heretofore been available.

Although the foregoing description of the invention has been directed to separating and removing oil from an immiscible mixture of oil in water in which only two phases where involved, an oil phase and a water phase, it is not limited thereto but also includes selective removal of oil from an immiscible mixture of oil in any water based substance having a higher specific gravity than the oil in which three or more phases are involved, the oil phase, the water phases and any phases which are held in a stable suspension in the water phase. In this case it is desired to selectively remove the oil while leaving stable suspension substantially unchanged.

A specific example in which three or more phases are involved to which this invention has particular applicability is the removal of machine oil from a water-based emulsion coolant. An emulsion is generally a two-phase system consisting of two incompletely miscible liquids, one being dispersed and held in stable suspension in the other by the aid of an emulsifying agent whose function is to reduce the interfacial tension between the two phases to increase the ease of formation and to promote the stability of the emulsion. In a typical water-based emulsion coolant one part of a mixture of about 85 percent mineral oil and 15 percent emulsifier is dispersed in about 32 parts of water to form a water-based emulsion having about 3.1–3.2 percent mineral oil stably suspended therein. During a machining operation the coolant can pick up as much as 3.7 percent machine oil creating a three-phase mixture, two oil phases and a water phase, to about 6.8–6.9 percent. Since the emulsion can only hold 3.1–3.2 percent oil in stable suspension the oil that is picked up in excess and must be separated and removed if the emulsion coolant is to be reused. In passing the immiscible mixture of excess oil in the stable emulsion coolant through the apparatus embodied by this invention the excess oil coalesces on the surfaces of the knitted polymer packing while the water and that amount of oil which is held in stable suspension passes through the packing substantially unaffected.

In one series of tests the mixture containing about 6.9 percent oil was passed through the apparatus previously described having a container volume of 7.22 cubic feet at a rate of 1 gallon per minute. The initial rate of oil removal was about 0.25 gallons/cubic foot/hour which rose to about 0.41 after an hour and then slowly decreased reaching a steady-state rate of removal of 0.305 to 0.31 gallons/cubic foot/hour after about 3 hours. Therefore, in a 24-hour period about 1,440 gallons of a mixture of excess oil in stable emulsion of oil and water can be passed through the apparatus whereby about 54 gallons of excess oil can be separated and collected in that time. Analysis of the water-based emulsion following separation showed only a 0.1 percent drop in the mineral oil concentration. It is apparent then that this invention also offers an extremely efficient method of selectively removing excess oil from a stable emulsion of oil and water.

Although the invention has been described in terms of a specific embodiment, it will be understood that various modifications may be made within the scope of the invention.

I claim:

1. An apparatus for continuously separating and removing oil from an immiscible mixture of oil in water or oil in a water based substance having a higher specific gravity than said oil comprising:
   vertically disposed container adapted to be filled to a predetermined level,
   tube inlet means communicating with said container,
   first tube outlet means communicating with said container,
   first tube outlet means in the upper portion of said container communicating at said level for removing said oil from the surface of said water or said water-based substance following separation from said mixture,
   perforated support means mounted across said container between said inlet means and said first outlet means,
   a knitted polymer packing having mesh forming openings for coalescing and drawing said oil upwardly on the surface of said packing to said level while allowing said water of water-based substance to flow through said openings and fill said container to said level, said packing being mounted on said support means and extending at least to said level, said packing being spaced from the top and sides of said container being below said first tube outlet means, said knitted polymer being selected from the group consisting of polyethylene, polypropylene, polyvinyl chloride, and copolymers or mixtures thereof, and
   second tube outlet means communicating with the bottom of said container for removing said water or water based substance following separation of said oil from said mixture.

2. An apparatus for continuously separating and removing oil from an immiscible mixture of oil in water or oil in a water based substance having a higher specific gravity than said oil comprising:
   a vertically disposed container adapted to be filled to a predetermined level having a perforated tube centrally disposed thereof,
   tube inlet means communicating with one end of said perforated tube,
   a knitted polymer packing having mesh forming openings for coalescing and drawing said oil upwardly on the surface of said packing to said level while allowing said water or water-based substance to flow through said openings and fill said container to said level, said packing being wrapped around said perforated tube in space relation to the top and sides of said container and extending at least to said level, said knitted polymer being selected from the group consisting of polyethylene, polypropylene, polyvinyl chloride, and copolymers or mixtures thereof,
   tube outlet means disposed in the upper portion of said container above the top of said packing and communicating with said container at said level for removing said oil from the surface of said water or said water-based substance following separation from said mixture, and
   tube outlet means communicating with the bottom of said container for removing said water or water based substance following separation of said oil from said mixture.

3. The apparatus of claim 2 wherein said knitted polymer packing is formed of polypropylene and wherein said openings are generally square in shape having approximately 0.125-inch sides.

4. A method of continuously separating and removing oil from an immiscible mixture of oil in water in a water based substance having a higher specific gravity than said oil comprising the steps of:
   passing said immiscible mixture through the openings of a knitted polymer packing mounted in a vertically disposed container and extending to a predetermined level, said knitted polymer being selected from the group consisting of polyethylene, polypropylene, polyvinyl chloride, and copolymers or mixtures thereof,
   allowing said oil to coalesce on the surface of said packing as said mixture flows therethrough to form an oil phase on the surface of said packing and the water phase filling said container to said level,
   allowing said coalesced oil to be drawn upwardly along the surface of said packing by the combined action of the attractive force between said polymer packing and said oil and the difference in specific gravity between said phases,
   allowing said oil phase to be released from said packing on the surface of said water phase at said level,
   continuously removing said oil phase from the surface of said water phase, and
   continuously removing said water phase at a rate sufficient to maintain said level.

5. A method of continuously separating and removing from an immiscible mixture of oil in a water-based oil emulsion the oil in excess of that which is held in stable suspension in said water-based oil emulsion, said method comprising the steps of:
   passing said mixture through the openings of a knitted polymer packing mounted in a vertically disposed container and extending to a predetermined level, said knitted polymer packing being selected from the group consisting of polyethylene, polypropylene, polyvinyl chloride, and copolymers or mixtures thereof,
   allowing said excess oil to coalesce on the surface of said packing said emulsion to flow therethrough substantially unaffected to form an oil phase on the surface of said packing and an emulsion phase filling said container to said level,
   allowing said coalesced oil to be drawn upwardly along the surface of said packing by the combined action of the attractive force between said polymer packing and said excess oil and the difference in specific gravity between said phases,
   allowing said excess oil phase to be released from said packing on the surface of said emulsion phase at said level,
   continuously removing said excess oil from the surface of said emulsion phase, and
   continuously removing said emulsion phase at a rate sufficient to maintain said level.

* * * * *

PO-1050
(5/69)

UNITED STATES PATENT OFFICE
CERTIFICATE OF CORRECTION

Patent No. 3,617,548          Dated November 2, 1971

Inventor(s) Robert A. Willihnganz

It is certified that error appears in the above-identified patent and that said Letters Patent are hereby corrected as shown below:

Column 2, line 5, after reference numeral "24" insert -- in which it is contained, the oil rises along the surfaces of the polymer packing 18 to the surface of the oil-free water phase --; Column 2, line 45, "where" should read -- were --; Column 2, line 70, after "water phase," insert -- and bringing the total oil concentration in the water phase --. Claim 1, delete line 32 entirely. Claim 2, line 68, "space" should read -- spaced --.

Signed and sealed this 30th day of May 1972.

(SEAL)
Attest:

EDWARD M. FLETCHER, JR.        ROBERT GOTTSCHALK
Attesting Officer               Commissioner of Patents